US009965722B2

(12) United States Patent
Ding et al.

(10) Patent No.: US 9,965,722 B2
(45) Date of Patent: May 8, 2018

(54) OPTIMIZED DECISION-MAKING SYSTEM AND METHOD FOR MULTIPLE ORE DRESSING PRODUCTION INDEXES BASED ON CLOUD SERVER AND MOBILE TERMINALS

(71) Applicant: Northeastern University, Shenyang, Liaoning Province (CN)

(72) Inventors: Jinliang Ding, Shenyang (CN); Changxin Liu, Shenyang (CN); Tianyou Chai, Shenyang (CN); Lun Gao, Shenyang (CN)

(73) Assignee: NORTHEASTERN UNIVERSITY, Shenyang, Liaoning Province (CN)

( * ) Notice: Subject to any disclaimer, the term of this patent is extended or adjusted under 35 U.S.C. 154(b) by 203 days.

(21) Appl. No.: 15/107,013

(22) PCT Filed: Nov. 30, 2015

(86) PCT No.: PCT/CN2015/095925
§ 371 (c)(1),
(2) Date: Jun. 21, 2016

(87) PCT Pub. No.: WO2016/110165
PCT Pub. Date: Jul. 14, 2016

(65) Prior Publication Data
US 2016/0364649 A1 Dec. 15, 2016

(30) Foreign Application Priority Data
Jan. 7, 2015 (CN) .......................... 2015 1 0006752.3

(51) Int. Cl.
*G05B 19/05* (2006.01)
*G06N 5/04* (2006.01)
(Continued)

(52) U.S. Cl.
CPC ............ *G06N 5/045* (2013.01); *G05B 13/04* (2013.01); *G05B 19/05* (2013.01); *B03C 1/00* (2013.01);
(Continued)

(58) Field of Classification Search
CPC ........ G06N 5/045; G05B 13/04; G05B 19/05; G05B 2219/13018; B03C 1/00; B07B 13/18
See application file for complete search history.

(56) References Cited

U.S. PATENT DOCUMENTS

| 2013/0118550 A1* | 5/2013 | Sahin .................... H01L 31/042 136/246 |
| 2014/0337429 A1* | 11/2014 | Asenjo .................. H04L 65/403 709/204 |
| 2015/0019191 A1* | 1/2015 | Maturana ............... G05B 17/02 703/13 |

FOREIGN PATENT DOCUMENTS

| CA | 2765275 A1 | 12/2010 |
| CN | 202424845 U | 9/2012 |

(Continued)

*Primary Examiner* — Mark Connolly
(74) *Attorney, Agent, or Firm* — Muncy, Geissler, Olds & Lowe, P.C.

(57) ABSTRACT

Provided is an optimized decision-making system for multiple ore dressing production indexes based on a cloud server and mobile terminals, including mobile intelligent terminals, a cloud server, a mobile industrial private cloud server, a collecting computer and process controllers PLC or DCS. The mobile industrial private cloud server calculates out multiple decision-making result solution sets; the intelligent mobile terminals determine the final decision-making results; the mobile industrial private cloud server calculates out process control set values; the mobile intelligent terminals determine the final process control set values; and the process controllers PLC or DCS control equipment on a (Continued)

production line for production according to the final process control set values. The present invention further provides an optimized decision-making method for multiple ore dressing production indexes adopting the optimized decision-making system.

6 Claims, 5 Drawing Sheets

(51) Int. Cl.
    *G05B 13/04*     (2006.01)
    *B03C 1/00*     (2006.01)
    *B07B 13/18*     (2006.01)

(52) U.S. Cl.
    CPC .... *B07B 13/18* (2013.01); *G05B 2219/13018* (2013.01)

(56) References Cited

FOREIGN PATENT DOCUMENTS

| CN | 103559783 A | 2/2014 |
|---|---|---|
| CN | 103929496 A | 7/2014 |
| CN | 104570739 A | 4/2015 |

\* cited by examiner

A user sets and then sends the ore dressing production indexes, the target value range of the ore dressing production indexes, the optimized decision-making model as well as boundary and constraint conditions thereof for the ore dressing production indexes, the optimized decision-making variables for the ore dressing production indexes, the time range of the ore dressing production indexes, the time range of the decision-making variables for the ore dressing production indexes, and the optimized decision-making algorithm and algorithm parameters for the multiple ore dressing production indexes at the intelligent mobile terminals to the mobile industrial private cloud server through the cloud server;

↓

The mobile industrial private cloud server calculates out multiple decision-making result solution sets according to the ore dressing production indexes, the target value range of the ore dressing production indexes, the optimized decision-making model as well as boundary and constraint conditions thereof for the ore dressing production indexes, the optimized decision-making variables for the ore dressing production indexes, the time range of the ore dressing production indexes and the time range of the decision-making variables for the ore dressing production indexes, which are set by the intelligent mobile terminals and through the adoption of the optimized decision-making algorithm and algorithm parameters for the multiple ore dressing production indexes, sends the multiple decision-making result solution sets to the process data center, and then sends the multiple decision-making result solution sets from the process data center to the intelligent mobile terminals through the cloud server;

↓

The intelligent mobile terminals display the decision-making result solution sets, determine the final decision-making results based on the result solution sets, and send the final decision-making results to the mobile industrial private cloud server through the cloud server;

↓ (A)

(B)

FIG. 3a

OPTIMIZED DECISION-MAKING SYSTEM AND METHOD FOR MULTIPLE ORE DRESSING PRODUCTION INDEXES BASED ON CLOUD SERVER AND MOBILE TERMINALS

BACKGROUND OF THE INVENTION

1. Field of the Invention

The present invention belongs to the field of information technologies, and particularly relates to an optimized decision-making system and method for multiple ore dressing production indexes based on a cloud server and mobile terminals.

2. The Prior Arts

Currently, in the ore dressing production in China, production process control is mostly limited to local control: different stages of the production process are controlled by separately building respective engineering stations in different regions of a plant. However, this way has the shortcomings that the construction cost is high, maintenance is difficult, potential safety hazards exist, production statuses are inconvenient to monitor, and dynamic management and optimization are difficult to perform.

In ore dressing production, the working procedures are interrelated and coupled each other, but a conventional control system ignores the relation, so that the conventional control system is difficult to coordinate all the working procedures, the potential of a production line cannot be completely realized, and the whole process of planning cannot be made; besides, the decision-making optimization objective of a conventional ore dressing optimization system is not comprehensive enough. For example, only single index such as efficiency or cost is considered, but other indexes such as resource consumption, energy consumption and yield are ignored.

The conventional control system retains the collected production process data and historical data in the engineering stations, so that the production data is incomplete and easy to lose, the overall status of the production process cannot be get systematically, and a reliable basis cannot be provided for the decision-making of multiple production indexes.

The management team, engineers and researchers need to monitor the production and decision-making process, and give decision-making commands through a specific computer. Both time and places are limited, so that real-time interaction between the time, the places and the production process cannot be realized.

SUMMARY OF THE INVENTION

For the deficiencies of the prior art, the present invention provides an optimized decision-making system and method for multiple ore dressing production indexes based on a cloud server and mobile terminals.

The optimized decision-making system and method adopt the following technical solution:

the optimized decision-making system for multiple ore dressing production indexes based on a cloud server and mobile terminals includes mobile intelligent terminals, a cloud server, a mobile industrial private cloud server, a collecting computer and process controllers PLC or DCS, wherein the mobile intelligent terminals are connected with the cloud server via a wireless network; the cloud server is connected with the mobile industrial private cloud server via Ethernet; the mobile industrial private cloud server is mounted inside an ore dressing plant; the mobile industrial private cloud server is connected with the collecting computer and the process controllers PLC or DCS via Ethernet, and the collecting computer is connected with the process controllers PLC or DCS in the ore dressing plant via industrial Ethernet;

the mobile intelligent terminals are used for setting ore dressing production indexes, the target value range of the ore dressing production indexes, an optimized decision-making model as well as boundary and constraint conditions thereof for the ore dressing production indexes, optimized decision-making variables for the ore dressing production indexes, the time range of ore dressing production indexes and the time range of decision-making variables for the ore dressing production indexes, setting and modifying an optimized decision-making algorithm for the multiple ore dressing production indexes, setting and modifying algorithm parameters, determining the final decision-making results as well as equipment and energy distribution results based on multiple decision-making result solution sets provided by the mobile industrial private cloud server, sending the results via the cloud server to the mobile industrial private cloud server, and besides displaying the decision-making result solution sets, the final decision-making results, process control set values, equipment and energy distribution results, and the production data of the process controllers PLC or DCS;

the ore dressing production indexes include concentrate grades, the ratio of full concentration, the metal recovery rate, the unit cost of concentrate and concentrate yield;

the boundary and constraint conditions of the optimized decision-making model for the ore dressing production indexes include: equipment production capacity constraints, tail ore grade constraints, multiple production index constraints, available raw ore resource constraints and energy resource constraints;

each mobile terminal is provided with a mobile terminal subsystem including a production index management module, a boundary and constraint condition management module, a decision-making variable management module, a PI decision-making procedure management module, an algorithm management module, a PI result display and adjustment module, a process control module and a report management module;

the production index management module is used for displaying and setting the ore dressing production indexes, the target value range of the ore dressing production indexes, and the optimized decision-making model for the ore dressing production indexes, and sending the set ore dressing production indexes, the target value range of the ore dressing production indexes, and the optimized decision-making model for the ore dressing production indexes to the mobile industrial private cloud server through the cloud server;

the boundary and constraint condition management module is used for displaying and setting the boundary and constraint conditions of the optimized decision-making model for the ore dressing production indexes, and sending the set boundary and constraint conditions of the optimized decision-making model to the mobile industrial private cloud server through the cloud server;

the decision-making variable management module is used for displaying, setting and modifying the optimized decision-making variables for the ore dressing production indexes, and sending the modified optimized decision-making variables to the cloud server, wherein the decision-making variables represent the use amount of various kinds of raw ore;

the PI decision-making procedure management module is used for displaying and determining the time range of the ore dressing production indexes, determining the time range of the decision-making variables according to the time range of the ore dressing production indexes, and sending the determined time range of the decision-making variables to the mobile industrial private cloud server through the cloud server;

the algorithm management module is used for displaying, setting and modifying the optimized decision-making algorithm for the multiple ore dressing production indexes, setting and modifying the algorithm parameters, and sending the modified optimized decision-making algorithm and the modified algorithm parameters to the mobile industrial private cloud server through the cloud server;

the PI result display and adjustment module is used for displaying multiple decision-making result solution sets provided by the mobile industrial private cloud server, determining the final decision-making results, and sending the final decision-making results to the mobile industrial private cloud server through the cloud server;

the process control module is used for displaying process control set values and scheduling and distribution situations of equipment and energy resources, and sending the final process control set values and the final distribution results of the equipment and the energy resources to the mobile industrial private cloud server through the cloud server;

the report management module is used for making production status reports, and displaying production data of equipment and data of all modules in the mobile terminal subsystems;

the cloud server is used for realizing data exchange between the mobile intelligent terminals and the mobile industrial private cloud server;

the mobile industrial private cloud server is used for distributing and monitoring data from the intelligent mobile terminals, calculating out multiple decision-making result solution sets according to the ore dressing production indexes, the target value range of the ore dressing production indexes, an optimized decision-making model as well as boundary and constraint conditions thereof for the ore dressing production indexes, optimized decision-making variables for the ore dressing production indexes, the time range of the ore dressing production indexes and the time range of the decision-making variables for the ore dressing production indexes, which are set by the intelligent mobile terminals and through the adoption of the optimized decision-making algorithm and algorithm parameters for the multiple ore dressing production indexes, calculating out the process control set values according to the final decision-making results determined by the intelligent mobile terminals, sending the set values to the intelligent mobile terminals through the cloud server, setting the set values for the controllers PLC or DCS in the ore dressing plant according to the calculated process control set values, besides, storing production data from the collecting computer and data from the mobile intelligent terminals, and sending the production data from the collecting computer to the intelligent mobile terminals through the cloud server;

the mobile industrial private cloud server is provided with a mobile industrial private cloud server subsystem including: a production scheduling machine, a decision-making optimization machine, an information management machine, and a process data center, wherein the information management machine is used for distributing and monitoring data from the intelligent mobile terminals: distributing the ore dressing production indexes, the target value range of the ore dressing production indexes, an optimized decision-making model as well as boundary and constraint conditions thereof for the ore dressing production indexes, optimized decision-making variables for the ore dressing production indexes, the time range of the production indexes, the time range of the decision-making variables, and the optimized decision-making algorithm and algorithm parameters for the multiple ore dressing production indexes to the decision-making optimization machine; distributing the final decision-making results to the production scheduling machine; sending the data from all intelligent mobile terminals to the process data center; and besides, storing the production data from the collecting computer in the process data center, and sending the data from the process data center to the mobile intelligent terminals;

the decision-making optimization machine calculates out multiple decision-making result solution sets according to the ore dressing production indexes, the target value range of the ore dressing production indexes, the optimized decision-making model as well as boundary and constraint conditions thereof for the ore dressing production indexes, the optimized decision-making variables for the ore dressing production indexes, the time range of the production indexes and the time range of the decision-making variables, which are set by the intelligent mobile terminals and through the adoption of the optimized decision-making algorithm and algorithm parameters for the multiple ore dressing production indexes, and sending the multiple decision-making result solution sets to the process data center;

the production scheduling machine is used for calculating out the process control set values according to the final decision-making results, and setting the set values of the controllers PLC or DCS in the ore dressing plant;

the process data center is used for storing production data from the collecting computer and data from the mobile intelligent terminals, converting the form of the data, providing the converted data to the information management machine, the decision-making optimization machine and the production scheduling machine, and receiving and storing information from the information management machine, the decision-making optimization machine and the production scheduling machine.

the collecting computer is used for collecting the production data of equipment in the ore dressing plant, and sending the data to the mobile industrial private cloud server, wherein the production data includes detected values of objects under process control, the number of production days of the equipment, the number of shutdown days of the equipment, the total running time of the equipment, downtime, and product yield; and the process controllers PLC or DCS are used for controlling the equipment on the production line for production according to the process control set values.

An optimized decision-making method for multiple ore dressing production indexes adopting the optimized decision-making system for multiple ore dressing production indexes based on a cloud server and mobile terminals includes the steps:

Step 1: a user sets and then sends the ore dressing production indexes, the target value range of the ore dressing production indexes, the optimized decision-making model as well as boundary and constraint conditions thereof for the ore dressing production indexes, the optimized decision-making variables for the ore dressing production indexes, the time range of the ore dressing production indexes, the time range of the decision-making variables for the ore dressing production indexes, and the optimized decision-making algorithm and algorithm parameters for the multiple ore dressing production indexes at the intelligent mobile terminals to the mobile industrial private cloud server through the cloud server;

Step 2: the mobile industrial private cloud server calculates out multiple decision-making result solution sets according to the ore dressing production indexes, the target value range of the ore dressing production indexes, the optimized decision-making model as well as boundary and constraint conditions thereof for the ore dressing production indexes, the optimized decision-making variables for the ore dressing production indexes, the time range of the ore dressing production indexes and the time range of the decision-making variables for the ore dressing production indexes, which are set by the intelligent mobile terminals and through the adoption of the optimized decision-making algorithm and algorithm parameters for the multiple ore dressing production indexes, sends the multiple decision-making result solution sets to the process data center, and then sends the multiple decision-making result solution sets from the process data center to the intelligent mobile terminals through the cloud server;

Step 3: the intelligent mobile terminals display the decision-making result solution sets, determine the final decision-making results based on the result solution sets, and send the final decision-making results to the mobile industrial private cloud server through the cloud server;

Step 4: the mobile industrial private cloud server calculates out the process control set values according to the final decision-making results, and sends the calculated process control set values to the intelligent mobile terminals through the cloud server;

Step 5: the intelligent mobile terminals display the process control set values, determine the final process control set values, perform equipment and energy resource scheduling and distribution according to the final decision-making results in combination with the data from the collecting computer, and send the results of equipment and energy resource scheduling and distribution and the final process control set values to the mobile industrial private cloud server through the cloud server;

Step 6: the mobile industrial private cloud server sends the determined final process control set values to the process controllers PLC or the DCS;

Step 7: the process controllers PLC or DCS control the equipment on the production line for production according to the final process control set values;

Step 8: the collecting computer collects production data of the process controllers PLC or DCS in the ore dressing plant, and sends the production data to the mobile industrial private cloud server;

Step 9: the industrial private cloud server stores the production data from the collecting computer and sends the production data to the intelligent mobile terminals through the cloud server;

Step 10: the mobile intelligent terminals display the production process data; and Step 11: the dressing production is determined, that is, when a deviation value between the actual production index value and the final decision-making value is larger than a threshold value preset by the user, the operations are enabled to return to Step 2, and a re-optimized decision for remaining production time within the time range of the ore dressing production indexes is made.

The optimized decision-making system and method for multiple ore dressing production indexes based on a cloud server and mobile terminals have the beneficial effects of providing a new system for index optimizing decision-making and management scheduling, realizing the purpose that a user achieves remote real-time monitoring and mobile operation on the operation status of the plant through the application of the Internet and a cloud technology, achieving the unified management and analysis of data, and effectively solving the problem that a conventional control system relies on the engineering stations. The optimized decision-making system and method have the advantages of being low in construction cost, convenient to maintain, free from potential safety hazards, and the like, control operation does not need to be performed by a specific computer, the production status is monitored in real time, and dynamic management and optimization are realized. According to the system, an intelligent optimization algorithm is used for replacing human trial and error decision-making, the internal relations of the working procedures are analyzed from the overall situation of the plant, and the production potential of the plant is effectively developed. According to the present invention, virtual hosts running on industrial cloud are used as engineer stations traditionally scattered in different areas of an industrial site, so that on one hand, data maintenance and potential safety hazards caused by the independent and scattered engineer stations are reduced, on the other hand, by using an Intranet cloud data center, centralized management of enterprise data is also facilitated, and the following big data analysis is facilitated. In combination with new computer and Internet technologies, and through the use of widely applied manner of intelligent terminals and cloud control, management teams and R & D personnel can access and monitor the control and optimizing status of an industrial system through mobile phones, tablets and other smart terminals anytime anywhere, view business operation analysis reports, and issue guidance advices anytime as needed.

BRIEF DESCRIPTION OF THE DRAWINGS

FIGS. 3a-3c are flowcharts of the optimized decision-making method for multiple ore dressing production indexes based on a cloud server and mobile terminals in the detailed description of the present invention.

DETAILED DESCRIPTION OF THE PREFERRED EMBODIMENT

The detailed description of the present invention is provided in combination with the accompanying drawings.

Figure 1:
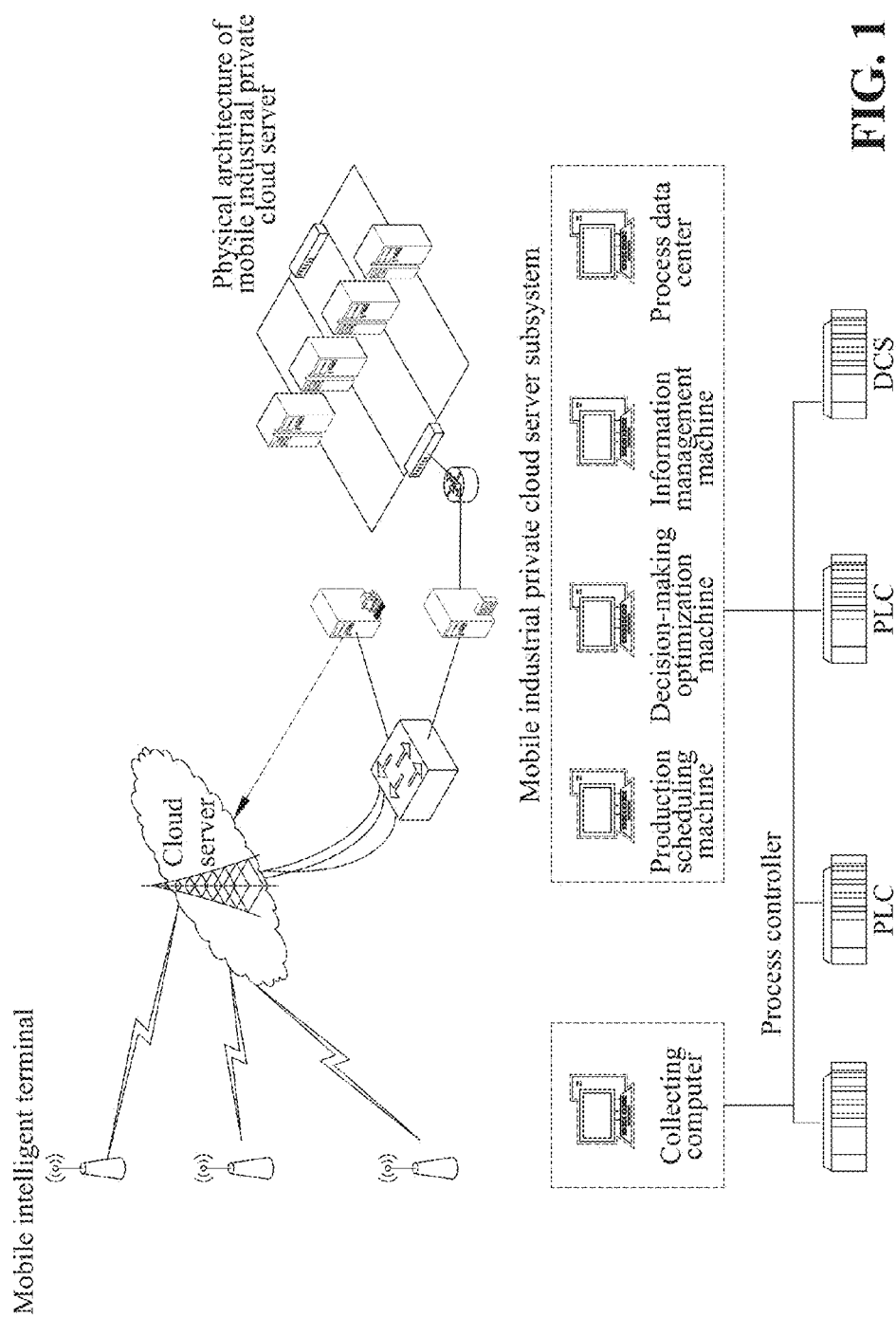
FIG. 1 is a structural schematic view of the optimized decision-making system for multiple ore dressing production indexes based on a cloud server and mobile terminals in the detailed description of the present invention.

As shown in FIG. 1, an optimized decision-making system for multiple ore dressing production indexes based on a cloud server and mobile terminals includes mobile intelligent terminals, a cloud server, a mobile industrial private cloud server, a collecting computer and process controllers PLC or DCS.

The mobile intelligent terminals are connected with the cloud server via a wireless network; the cloud server is connected with the mobile industrial private cloud server via Ethernet; the mobile industrial private cloud server is mounted inside an ore dressing plant; the mobile industrial private cloud server is connected with the collecting computer and the process controllers PLC or DCS via Ethernet, and the collecting computer is connected with the process controllers PLC or DCS in the ore dressing plant via industrial Ethernet.

Figure 2:
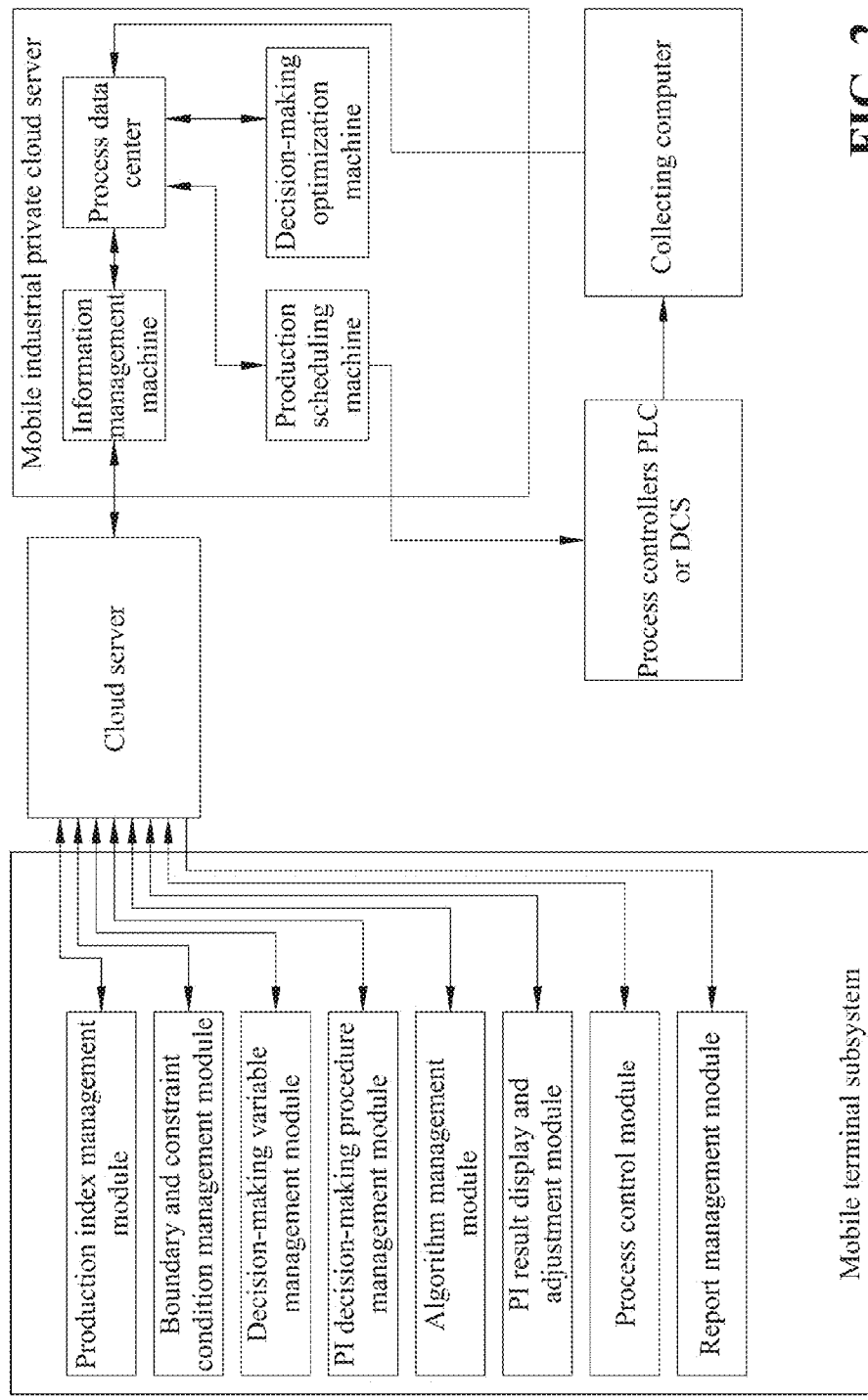
FIG. 2 is a structural block diagram of the optimized decision-making system for multiple ore dressing production indexes based on a cloud server and mobile terminals in the detailed description of the present invention.

A structural block diagram of the optimized decision-making system for multiple ore dressing production indexes based on a cloud server and mobile terminals in the embodiment of the present invention is as shown in FIG. 2.

In the embodiment of the present invention, the selected mobile intelligent terminals are four units of Samsung tab st705c Model, and three Trekstor wireless on-screen projectors.

The mobile intelligent terminals are used for setting ore dressing production indexes, the target value range of the ore dressing production indexes, the optimized decision-making model as well as boundary and constraint conditions thereof for the ore dressing production indexes, the optimized decision-making variables for the ore dressing production indexes, the time range of ore dressing production indexes and the time range of decision-making variables for the ore dressing production indexes, setting and modifying an optimized decision-making algorithm for the multiple ore dressing production indexes, setting and modifying algorithm parameters, determining the final decision-making results as well as equipment and energy distribution results based on multiple decision-making result solution sets provided by the mobile industrial private cloud server, sending the results via the cloud server to the mobile industrial private cloud server, and besides displaying the decision-making result solution sets, the final decision-making results, process control set values, equipment and energy distribution results, and the production data of the process controllers PLC or DCS.

The ore dressing production indexes include concentrate grades, the ratio of full concentration, the metal recovery rate, the unit cost of concentrate and concentrate yield.

The boundary and constraint conditions of the optimized decision-making model for the ore dressing production indexes include: equipment production capacity constraints, tail ore grade constraints, multiple production index constraints, available raw ore resource constraints and energy resource constraints.

Each mobile terminal is provided with a mobile terminal subsystem including: a production index management module, a boundary and constraint condition management module, a decision-making variable management module, a PI decision-making procedure management module, an algorithm management module, a PI result display and adjustment module, a process control module and a report and management module, wherein the production index management module is used for displaying and setting the ore dressing production indexes, the target value range of the ore dressing production indexes, and the optimized decision-making model for the ore dressing production indexes, and sending the set ore dressing production indexes, the target value range of the ore dressing production indexes, and the optimized decision-making model for the ore dressing production indexes to the mobile industrial private cloud server through the cloud server;

the boundary and constraint condition management module is used for displaying and setting the boundary and constraint conditions of the optimized decision-making model for the ore dressing production indexes, and sending the set boundary and constraint conditions of the optimized decision-making model to the mobile industrial private cloud server through the cloud server;

the decision-making variable management module is used for displaying, setting and modifying the optimized decision-making variables for the ore dressing production indexes, and sending the modified optimized decision-making variables to the cloud server, wherein the decision-making variables represent the use amount of various kinds of raw ore;

the PI decision-making procedure management module is used for displaying and determining the time range of the ore dressing production indexes, determining the time range of the decision-making variables according to the time range of the ore dressing production indexes, and sending the determined time range of the decision-making variables to the mobile industrial private cloud server through the cloud server;

the algorithm management module is used for displaying, setting and modifying the optimized decision-making algorithm for the multiple ore dressing production indexes, setting and modifying the algorithm parameters, and sending the modified optimized decision-making algorithm and the modified algorithm parameters to the mobile industrial private cloud server through the cloud server;

the PI result display and adjustment module is used for displaying multiple decision-making result solution sets provided by the mobile industrial private cloud server, determining the final decision-making results, and sending the final decision-making results to the mobile industrial private cloud server through the cloud server;

the process control module is used for displaying process control set values and scheduling and distribution situations of equipment and energy resources, and sending the final process control set values and the final distribution results of equipment and energy resources to the mobile industrial private cloud server through the cloud server; and the report management module is used for making production condition reports, and displaying production data of equipment and data of all modules in the mobile terminal subsystems.

The cloud server is used for realizing data exchange between the mobile intelligent terminals and the mobile industrial private cloud server by use of AliCloud.

The mobile industrial private cloud server is used for distributing and monitoring data from the intelligent mobile terminals, calculating out multiple decision-making result solution sets according to the ore dressing production indexes, the target value range of the ore dressing production indexes, the optimized decision-making model as well as boundary and constraint conditions thereof for the ore dressing production indexes, the optimized decision-making variables for the ore dressing production indexes, the time range of the ore dressing production indexes and the time range of the decision-making variables for the ore dressing production indexes, which are set by the intelligent mobile terminals and through the adoption of the optimized decision-making algorithm and algorithm parameters for the multiple ore dressing production indexes, calculating out the process control set values according to the final decision-making results determined by the intelligent mobile terminals, sending the set values to the intelligent mobile terminals through the cloud server, setting the set values for the controllers PLC or DCS in the ore dressing plant according to the calculated process control set values, besides, storing production data from the collecting computer and data from the mobile intelligent terminals, and sending the production data from the collecting computer to the intelligent mobile terminals through the cloud server.

In the embodiment of the present invention, the selected mobile industrial private cloud server is built from six Dell R730XD rack servers with the basic configuration of E5-2650*2/192G/5*480 SSD/4 GB+20 GB NIC, two Huawei s1700_24gr 24 industrial Intranet switches, and two D-LINK DI-7100G routers.

The mobile industrial private cloud server is provided with a mobile industrial private cloud server subsystem including: a production scheduling machine, a decision-making optimization machine, an information management machine, and a process data center, wherein the information management machine is used for distributing and monitoring data from the intelligent mobile terminals: distributing the ore dressing production indexes, the target value range of the ore dressing production indexes, the optimized decision-making model as well as boundary and constraint conditions thereof for the ore dressing production indexes, the optimized decision-making variables for the ore dressing production indexes, the time range of the production indexes, the time range of the decision-making variables, and the optimized decision-making algorithm and algorithm parameters for the multiple ore dressing production indexes to the decision-making optimization machine; distributing the final decision-making results to the production scheduling machine; sending the data from all intelligent mobile terminals to the process data center; and besides, storing the production data from the collecting computer in the process data center, and sending the data from the process data center to the mobile intelligent terminals;

the decision-making optimization machine calculates out multiple decision-making result solution sets according to the ore dressing production indexes, the target value range of the ore dressing production indexes, the optimized decision-making model as well as boundary and constraint conditions thereof for the ore dressing production indexes, the optimized decision-making variables for the ore dressing production indexes, the time range of the production indexes and the time range of the decision-making variables, which are set by the intelligent mobile terminals and through the adoption of the optimized decision-making algorithm and algorithm parameters for the multiple ore dressing production indexes, and sending the multiple decision-making result solution sets to the process data center;

the production scheduling machine is used for calculating out the process control set values according to the final decision-making results, and setting the set values of the controllers PLC or DCS in the ore dressing plant; and the process data center is used for storing production data from the collecting computer and data from the mobile intelligent terminals, converting the form of the data, providing the converted data to the information management machine, the decision-making optimization machine and the production scheduling machine, and receiving and storing information from the information management machine, the decision-making optimization machine and the production scheduling machine.

The collecting computer is used for collecting the production data of equipment in the ore dressing plant, and sending the data to the mobile industrial private cloud server, wherein the production data includes detected values of objects under process control, the number of production days of the equipment, the number of shutdown days of the equipment, the total running time of the equipment, downtime, and product yield.

In the embodiment of the present invention, the selected computer is a dell-T5500 workstation, with the basic configuration of Xeon E5506/2 GB/320 GB.

The process controllers PLC or DCS are used for controlling the equipment on the production line for production according to the process control set values.

In the embodiment of the present invention, the type of the selected process controllers PLC is Siemens S7-300.

Figure 3B:
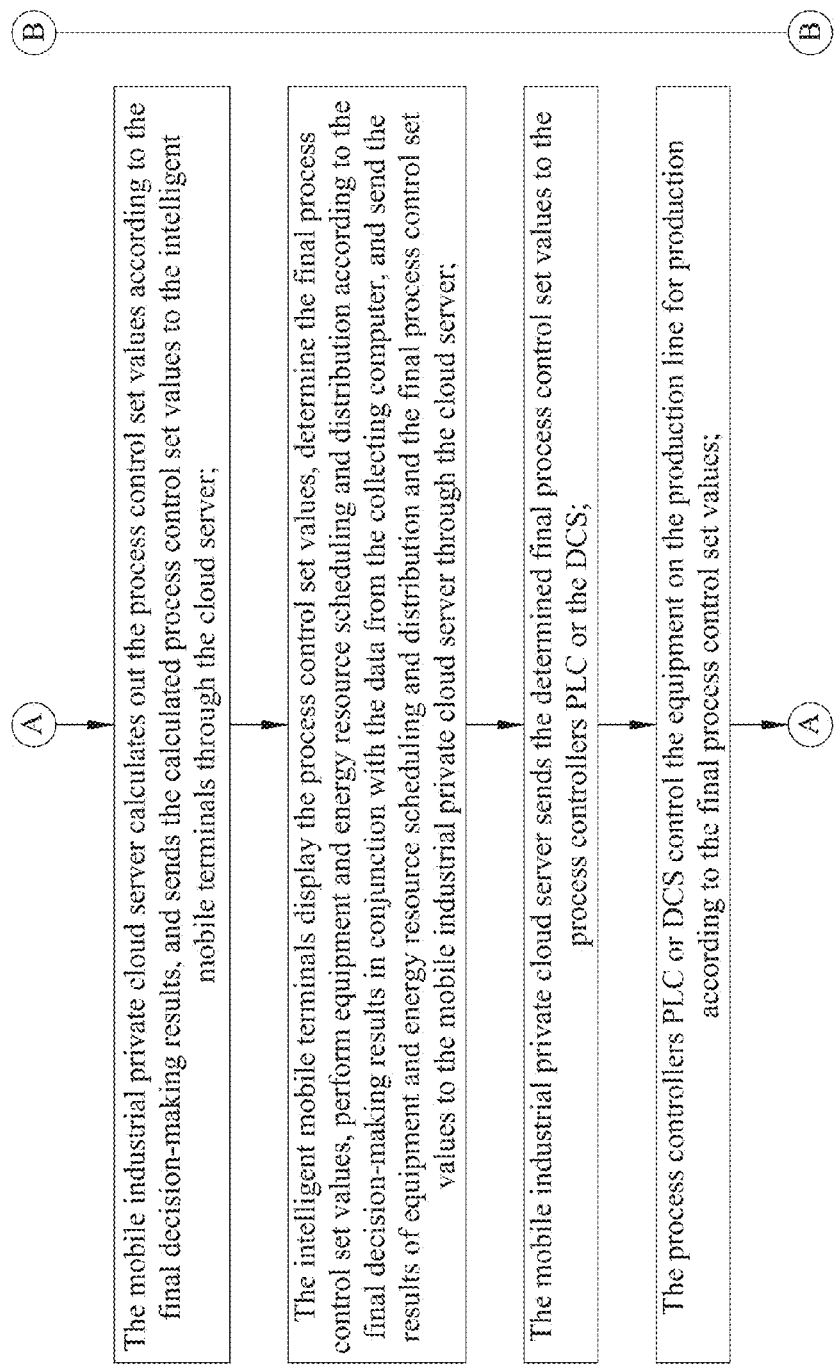
Figure 3C:
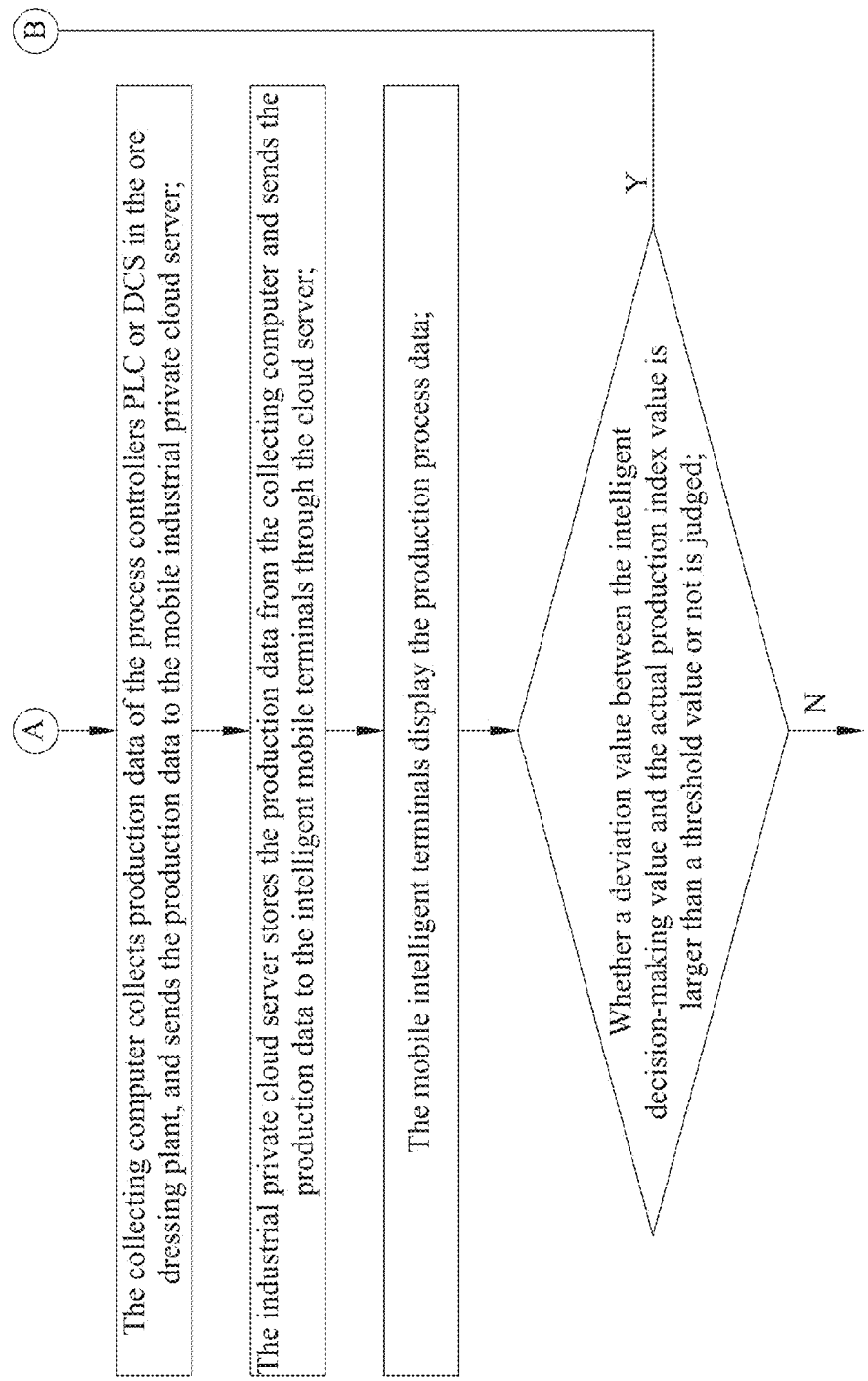

As shown in FIGS. 3a-3c, an optimized decision-making method for multiple ore dressing production indexes adopting the optimized decision-making system for multiple ore dressing production indexes based on a cloud server and mobile terminals includes the following steps.

Step 1: a user sets and then sends the ore dressing production indexes, the target value range of the ore dressing production indexes, the optimized decision-making model as well as boundary and constraint conditions thereof for the ore dressing production indexes, the optimized decision-making variables for the ore dressing production indexes, the time range of the ore dressing production indexes, the time range of the decision-making variables for the ore dressing production indexes, and the optimized decision-making algorithm and algorithm parameters for the multiple ore dressing production indexes at the intelligent mobile terminals to the mobile industrial private cloud server through the cloud server.

In the embodiment of the present invention, the ore dressing production indexes include concentrate grades, the ratio of full concentration, the metal recovery rate, the unit cost of concentrate and concentrate yield; The ore dressing production indexes are as shown in Table 1:

TABLE 1

Ore Dressing Production Indexes

| Target range | RANGE VALUE | Unit |
|---|---|---|
| Concentrate grade | [52.5, 53.0] | [%] |
| Ratio of full concentration | 2.0 | [Times] |
| Metal recovery rate | 75.0 | [%] |
| Cost of concentrate | 200 | [RMB/Ton] |
| Concentrate yield | [22.8, 23.0] | [10,000 tons] |

Time range of ore dressing production indexes: 1 year.

Time range of decision-making variables: the type and the quantity of raw ore used in one month.

Optimized decision-making algorithm for ore dressing production indexes: NSGA-II, SPEA2, G-NSGA-II, G-SPEA2.

Algorithm parameters: genetic probability: 0.9, mutation probability: 0.1, number of evolution generation: 1000, gradient operator probability: 0.1, step distribution coefficient: 20, 20, and population size: 200.

Optimized decision-making model for ore dressing production indexes:

Target model of concentrate yield is as shown in Equation (1):

$$\max Q(\vec{X}), Q(\vec{X}) = \sum_{i=1}^{I}(1-u_i)x_i/k_{1,i} + \sum_{i=1}^{I} u_i x_i/k_{2,i} \quad (1)$$

Target model of concentrate grade is as shown in Equation (2):

$$\max \beta(\vec{X}), \beta(\vec{X}) = \frac{\sum_{i=1}^{I}(1-u_i)\beta_{1,i}x_i/k_{1,i} + \sum_{i=1}^{I}u_i\beta_{2,i}x_i/k_{2,i}}{\sum_{i=1}^{I}(1-u_i)x_i/k_{1,i} + \sum_{i=1}^{I}u_ix_i/k_{2,i}} \quad (2)$$

Target model of the ratio of full concentration is as shown in Equation (3):

$$\min K(\vec{X}), K(\vec{X}) = \left(\sum_{i=1}^{I}x_i\right) \Big/ \left[\sum_{i=1}^{I}(1-u_i)x_i/k_{1,i} + \sum_{i=1}^{I}u_ix_i/k_{2,i}\right] \quad (3)$$

Target model of metal recovery rate is as shown in Equation (4):

$$\max \varepsilon(\vec{X}), \varepsilon(\vec{X}) = \frac{\sum_{i=1}^{I}(1-u_i)\beta_{1,i}x_i/k_{1,i} + \sum_{i=1}^{I}u_i\beta_{2,i}x_i/k_{2,i}}{\sum_{i=1}^{I}x_i\alpha_i} \quad (4)$$

Target model of cost of concentrate is as shown in Equation (5):

$$\min C(\vec{X}), C(\vec{X}) = \frac{\sum_{i=1}^{I}r_ix_i + C_{other}}{\sum_{i=1}^{I}(1-u_i)x_i/k_{1,i} + \sum_{i=1}^{I}u_ix_i/k_{2,i}} + C_{energy} \quad (5)$$

wherein, $Q(\vec{X})$ is the concentrate yield, $\beta(\vec{X})$ is the concentrate grade, $K(\vec{X})$ is the ratio of full concentration, $\varepsilon(\vec{X})$ is the metal recovery rate, $C(\vec{X})$ is the cost of concentrate, i is the $i^{th}$ kind of raw ore, i=1, 2, . . . , I; $\alpha_i$ is the grade of raw ore i; $x_i$ is the processing capacity (tonnes) of the $i^{th}$ kind of raw ore; $\beta_{1,i}$ is the grade of strong magnetic concentrate in raw ore i; $\beta_{2,i}$ is the grade of weak magnetic concentrate in raw ore i; $u_i$ is lump ore ratio of raw ore i, namely the ratio of the amount of separated lump ore to the amount of raw ore; $k_{1,i}$ is the ore dressing ratio of fine ore screened out of raw ore i; $k_{2,i}$ is the ore dressing ratio of lump ore screened out of raw ore i; $r_i$ is the unit price (RMB/Ton) of raw ore i; $C_{energy}$ is the energy consumption cost for the unit tons of concentrate products; $C_{other}$ is other total fixed costs besides the costs of raw ore and energy, including fixed costs, controllable manufacturing costs, etc. The decision-making variable $x_i$ is the processing capacity (tonnes) of the $i^{th}$ kind of raw ore.

The boundary and constraint conditions of the optimized decision-making model for ore dressing indexes are as shown in Table 2:

TABLE 2

Boundary and Constraint Conditions of the Optimized Decision-Making Model for Ore Dressing Indexes

| | | |
|---|---|---|
| Shaft furnace capacity | | |
| $q_{1,H}$ | 25.0 | [Ton/hour] |
| Ball mill capacity | | |
| $q_{2,H}$ | 80.0 | [Ton/hour] |
| $q_{3,H}$ | 80.0 | [Ton/hour] |
| Inventory properties | | |
| $I_0$ | 1.5 | [10,000 tons] |
| $[I_L, I_H]$ | [1.0, 3.0] | [10,000 tons] |
| Amount of concentrate consumed by sintering | | |
| $Q_S$ | 22.8 | [10,000 tons] |
| Upper limit of grade of total tailings | | |
| $\theta_{0,H}$ | 21.0 | [%] |
| Calcination rate | | |
| $\eta_b$ | 82 | [%] |
| Waste rock rate | | |
| $\eta_w$ | 14 | [%] |
| Grade of waste rock | | |
| $\beta_w$ | 14 | [%] |
| Number of equipment | | |
| $N_{6,1}$ | 12 | [—] |
| $N_{8,1}$ | 15 | [—] |
| $N_{6,2}$ | 3 | [—] |
| $N_{8,2}$ | 4 | [—] |
| $N_{6,3}$ | 3 | [—] |
| $N_{8,3}$ | 4 | [—] |
| Run time of $k^{th}$ equipment set | | |
| $T_6$ | 2.08 | [Days] |
| $T_8$ | 27.08 | [Days] |
| Energy consumption cost for unit tons of concentrate | | |
| $C_{energy}$ | 17.66 | [RMB/Ton] |
| Other total fixed costs | | |
| $C_{other}$ | 3410000 | [RMB] |

Step 2: the mobile industrial private cloud server calculates out multiple decision-making result solution sets according to the ore dressing production indexes, the target value range of the ore dressing production indexes, the optimized decision-making model as well as boundary and constraint conditions thereof for the ore dressing production indexes, the optimized decision-making variables for the ore dressing production indexes, the time range of the ore dressing production indexes and the time range of the decision-making variables for the ore dressing production indexes, which are set by the intelligent mobile terminals and through the adoption of the optimized decision-making algorithm and algorithm parameters for the multiple ore dressing production indexes, sends the multiple decision-making result solution sets to the process data center, and then sends the multiple decision-making result solution sets from the process data center to the intelligent mobile terminals through the cloud server.

Step 3: the intelligent mobile terminals display the decision-making result solution sets, determine the final decision-making results based on the result solution sets, and send the final decision-making results to the mobile industrial private cloud server through the cloud server.

In the embodiment of the present invention, a specific decision-making result is as shown in Table 3:

TABLE 3

Decision-making Result (10,000 tons)

| Month | i | | | | | | | |
|---|---|---|---|---|---|---|---|---|
| m\i | 1 | 2 | 3 | 4 | 5 | 6 | 7 | 8 |
| 1 | 14.2816 | 19.7987 | 4.6741 | 1.6652 | 0 | 1.5064 | 0.119 | 0 |
| 2 | 13.347 | 17.2045 | 3.796 | 1.5613 | 0 | 0 | 2.415 | 0 |
| 3 | 12.6979 | 24.5381 | 3.5044 | 1.839 | 0 | 0 | 2.5268 | 0 |
| 4 | 8.3924 | 20.8068 | 4.0023 | 2.7508 | 0 | 0 | 2.7602 | 0 |
| 5 | 6.4822 | 24.7377 | 5.0811 | 1.6504 | 0 | 0 | 0 | 0 |
| 6 | 3.6008 | 24.6495 | 3.535 | 3.7109 | 0 | 0 | 2.9233 | 0 |
| 7 | 4.3947 | 20.1184 | 5.394 | 3.1071 | 1.0431 | 0 | 0 | 2.1822 |
| 8 | 9.815 | 23.9386 | 3.54 | 2.5809 | 1.1128 | 0 | 0 | 0.1066 |
| 9 | 12.5914 | 17.3891 | 3.5252 | 2.4076 | 1.0084 | 0 | 1.3485 | 0.1108 |
| 10 | 3.6648 | 23.0733 | 4.1326 | 4.0339 | 1.1742 | 0 | 1.4119 | 0 |
| 11 | 0 | 30.0153 | 3.5033 | 3.9038 | 1.0537 | 0 | 1.9942 | 0 |
| 12 | 0 | 23.4872 | 3.503 | 6.5374 | 1.0085 | 0 | 2.5708 | 0.1827 |

| Month | i | | | | | | |
|---|---|---|---|---|---|---|---|
| m\i | 9 | 10 | 11 | 12 | 13 | 14 | 15 |
| 1 | 0.6289 | 0.7819 | 0.2093 | 0 | 0 | 0 | 0 |
| 2 | 0.6314 | 0 | 1.7715 | 0 | 0 | 0 | 0 |
| 3 | 0 | 0 | 1.0314 | 0 | 0 | 0 | 0 |
| 4 | 1.0404 | 0 | 2.3537 | 0 | 0 | 0 | 1.0748 |
| 5 | 0.7088 | 0 | 1.5144 | 0 | 0 | 0 | 0.6096 |
| 6 | 0.7234 | 0 | 2.0849 | 0 | 0 | 0 | 1.3714 |
| 7 | 0 | 0 | 1.1629 | 0 | 0 | 0 | 2.9885 |
| 8 | 0 | 0 | 2.0041 | 0 | 0 | 0 | 0 |
| 9 | 0 | 0 | 0.6612 | 0 | 0 | 0 | 3.5409 |
| 10 | 0.4799 | 0 | 2.9608 | 0 | 0 | 0 | 0 |
| 11 | 0.3962 | 0 | 1.8456 | 0 | 0 | 0 | 1.6183 |
| 12 | 0 | 0 | 2.2923 | 0 | 0 | 0 | 3.7918 | wherein, i is the $i^{th}$ kind of raw ore.

Step 4: the mobile industrial private cloud server calculates out the process control set values according to the final decision-making results, and sends the calculated process control set values to the intelligent mobile terminals through the cloud server.

In the embodiment of the present invention, some of the process control set values calculated according to the final decision-making results are as shown in Table 4:

TABLE 4

Some Process Control Set Values

| Equipment | System | Set Values | Equipment | System | Set Values |
|---|---|---|---|---|---|
| Shaft furnace 2 | Control system 1 | 2568 | Ball mill 3 | Control system 2 | 3578 |
| | Control system 2 | 1486 | | Control system 4 | 1254 |
| | Control system 3 | 863 | | Control system 1 | 5684 |
| Magnetic separator 2 | Control system 2 | 636 | Grader 1 | Control system 2 | 865 |
| | Control system 1 | 831 | | Control system 4 | 1264 |
| | Control system 5 | 1566 | | Control system 1 | 6637 |

Step 5: the intelligent mobile terminals display the process control set values, determine the final process control set values, perform equipment and energy resource scheduling and distribution according to the final decision-making results in combination with the data from the collecting computer, and send the results of equipment and energy resource scheduling and distribution and the final process control set values to the mobile industrial private cloud server through the cloud server.

Step 6: the mobile industrial private cloud server sends the determined final process control set values to the process controllers PLC or the DCS.

Step 7: the process controllers PLC or DCS control the equipment on the production line for production according to the final process control set values.

Step 8: the collecting computer collects production data of the process controllers PLC or DCS in the ore dressing plant, and sends the production data to the mobile industrial private cloud server.

The production data includes: detected values of objects under process control, the number of production days of equipment, the number of shutdown days of equipment, total running time of equipment, downtime, and product yield.

In the embodiment of the present invention, the detected values of objects under process control include rotating speed of the ball mill and calcination temperature of the shaft furnace.

Some production data obtained from the equipment includes the number of calendar days, composite concentrate yield, the number of downtime days, strong concentrate yield, the number of production days, weak concentrate yield, the running time of the shaft furnace for raw ore, the running time of the shaft furnace for reverse ore, the running time of the strong magnetic machine roughing machine, the running time of the strong magnetic machine scavenging machine, the repair time of the strong magnetic machine, the total production running time of the strong magnetic ball mill, the scheduled repair time of the strong magnetic ball mill, the downtime of the strong magnetic mill, the failure time of the strong magnetic ball mill, the concentrate yield (/unit/hour) of the strong magnetic ball mill, the total production running time of the weak magnetic ball mill, the scheduled repair time of the weak magnetic ball mill, the downtime of the weak magnetic mill, the failure time of the weak magnetic ball mill, the concentrate yield (/unit/hour) of the weak magnetic ball mill, the rotating speed of the ball mill, and the calcination temperature of the shaft furnace, as shown in Table 5:

TABLE 4

| Some Production Data of Equipment | | | | |
|---|---|---|---|---|
| Number of calendar days | 30 | Composite concentrate yield | 228,000 tons | |
| Number of downtime days | 0.83 | Strong concentrate yield | 109,800 tons | |
| Number of production days | 29.17 | Weak concentrate yield | 118,200 tons | |
| Rotating speed of ball mill | 14.5 r/min | Calcination temperature of shaft furnace | 1255 DEG C. | |
| Shaft furnace | Total running time | 12008 h | Strong magnetic machine | Running time of roughing machine | 3377 h |
| | Running time of raw ore furnace | 10040 h | | Running time of scavenging machine | 3384 h |
| | Running time of reverse ore furnace | 1968 h | | Repair time | 8 h |
| Strong magnetic ball mill | Total production running time | 2699 h | Weak magnetic ball mill | Total production running time | 2699 h |
| | Scheduled repair time | 50 h | | Scheduled repair time | 50 h |
| | Downtime | 10 h | | Downtime | 10 h |
| | Failure time | 16 h | | Failure time | 16 h |
| | Others | 25.5 h | | Others | 25.5 h |
| | Concentrate yield (/unit/hour) | 40.69 t/h | | Concentrate yield (/unit/hour) | 43.80 t/h |

Step 9: the industrial private cloud server stores the production data from the collecting computer and sends the production data to the intelligent mobile terminals through the cloud server.

Step 10: the mobile intelligent terminals display the production process data.

Step 11: the dressing production is determined, that is, when a deviation value between the actual production index value and the final decision-making value is larger than a threshold value preset by the user, the operations are enabled to return to Step 2, and a re-optimized decision for remaining production time within the time range of the ore dressing production indexes is made.

What is claimed is:

1. An optimized decision-making system for multiple ore dressing production indexes based on a cloud server and mobile terminals, comprising: mobile intelligent terminals, a cloud server, a mobile industrial private cloud server, a collecting computer and process controllers PLC or DCS, wherein the mobile intelligent terminals are connected with the cloud server via a wireless network; the cloud server is connected with the mobile industrial private cloud server via Ethernet; the mobile industrial private cloud server is mounted inside an ore dressing plant; the mobile industrial private cloud server is connected with the collecting computer and the process controllers PLC or DCS via Ethernet, and the collecting computer is connected with the process controllers PLC or DCS in the ore dressing plant via industrial Ethernet;

the mobile intelligent terminals are used for setting ore dressing production indexes, the target value range of the ore dressing production indexes, an optimized decision-making model as well as boundary and constraint conditions thereof for the ore dressing production indexes, optimized decision-making variables for the ore dressing production indexes, the time range of ore dressing production indexes and the time range of decision-making variables for the ore dressing production indexes, setting and modifying an optimized decision-making algorithm for the multiple ore dressing production indexes, setting and modifying algorithm parameters, determining the final decision-making results as well as equipment and energy distribution results based on multiple decision-making result solution sets provided by the mobile industrial private cloud server, sending the final decision-making results as well as the equipment and energy distribution results via the cloud server to the mobile industrial private cloud server, and besides displaying the decision-making result solution sets, the final decision-making results, process control set values, equipment and energy distribution results, and the production data of the process controllers PLC or DCS;

the cloud server is used for realizing data exchange between the mobile intelligent terminals and the mobile industrial private cloud server;

the mobile industrial private cloud server is used for distributing and monitoring data from the intelligent mobile terminals, calculating out multiple decision-making result solution sets according to the ore dressing production indexes, the target value range of the ore dressing production indexes, the optimized decision-making model as well as boundary and constraint conditions thereof for the ore dressing production indexes, the optimized decision-making variables for the ore dressing production indexes, the time range of the ore dressing production indexes and the time range of the decision-making variables for the ore dressing production indexes, which are set by the intelligent mobile terminals and through the adoption of the optimized decision-making algorithm and algorithm parameters for the multiple ore dressing production indexes, calculating out the process control set values according to the final decision-making results determined by the intelligent mobile terminals, sending the set values to the intelligent mobile terminals through the cloud server, setting the set values for the controllers PLC or DCS in the ore dressing plant according to the calculated process control set values, besides, storing production data from the collecting computer and data from the mobile intelligent terminals, and sending the production data from the collecting computer to the intelligent mobile terminals through the cloud server;

the collecting computer is used for collecting the production data of equipment in the ore dressing plant, and sending the data to the mobile industrial private cloud server, wherein the production data includes detected values of objects under process control, the number of production days of the equipment, the number of shutdown days of the equipment, the total running time of the equipment, downtime, and product yield; and the process controllers PLC or DCS are used for controlling the equipment on the production line for production according to the process control set values.

2. The optimized decision-making system of claim 1, wherein each mobile terminal is provided with a mobile terminal subsystem comprises: a production index management module, a boundary and constraint condition management module, a decision-making variable management module, a PI decision-making procedure management module, an algorithm management module, a PI result display and adjustment module, a process control module and a report management module, wherein the production index management module is used for displaying and setting the ore dressing production indexes, the target value range of the ore dressing production indexes, and the optimized decision-making model for the ore dressing production indexes, and sending the set ore dressing production indexes, the target value range of the ore dressing production indexes, and the optimized decision-making model for the ore dressing production indexes to the mobile industrial private cloud server through the cloud server;

the boundary and constraint condition management module is used for displaying and setting the boundary and constraint conditions of the optimized decision-making model for the ore dressing production indexes, and sending the set boundary and constraint conditions of the optimized decision-making model to the mobile industrial private cloud server through the cloud server;

the decision-making variable management module is used for displaying, setting and modifying the optimized decision-making variables for the ore dressing production indexes, and sending the modified optimized decision-making variables to the cloud server, wherein the decision-making variables represents the use amount of various kinds of raw ore;

the PI decision-making procedure management module is used for displaying and determining the time range of the ore dressing production indexes, determining the time range of the decision-making variables according to the time range of the ore dressing production indexes, and sending the determined time range of the decision-making variables to the mobile industrial private cloud server through the cloud server;

the algorithm management module is used for displaying, setting and modifying the optimized decision-making algorithm for the multiple ore dressing production indexes, setting and modifying the algorithm parameters, and sending the modified optimized decision-making algorithm and the modified algorithm parameters to the mobile industrial private cloud server through the cloud server;

the PI result display and adjustment module is used for displaying multiple decision-making result solution sets provided by the mobile industrial private cloud server, determining the final decision-making results, and sending the final decision-making results to the mobile industrial private cloud server through the cloud server;

the process control module is used for displaying process control set values and scheduling and distribution situations of equipment and energy resources, and sending the final process control set values and the final distribution results of equipment and energy resources to the mobile industrial private cloud server through the cloud server; and the report management module is used for making production condition reports, and displaying production data of equipment and data of all modules in the mobile terminal subsystems.

3. The optimized decision-making system of claim 2, wherein the ore dressing production indexes include concentrate grades, the ratio of full concentration, a metal recovery rate, the unit cost of concentrate and concentrate yield.

4. The optimized decision-making system of claim 2, wherein the boundary and constraint conditions of the optimized decision-making model for the ore dressing production indexes include equipment production capacity constraints, tail ore grade constraints, multiple production index constraints, available raw ore resource constraints and energy resource constraints.

5. The optimized decision-making system of claim 1, wherein the mobile industrial private cloud server is provided with a mobile industrial private cloud server subsystem comprising a production scheduling machine, a decision-making optimization machine, an information management machine and a process data center, wherein the information management machine is used for distributing and monitoring data from the intelligent mobile terminals: distributing the ore dressing production indexes, the target value range of the ore dressing production indexes, the optimized decision-making model as well as boundary and constraint conditions thereof for the ore dressing production indexes, the optimized decision-making variables for the ore dressing production indexes, the time range of the production indexes, the time range of the decision-making variables, and the optimized decision-making algorithm and algorithm parameters for the multiple ore dressing production indexes to the decision-making optimization machine; distributing the final decision-making results to the production scheduling machine; sending the data from all intelligent mobile terminals to the process data center; and besides, storing the production data from the collecting computer in the process data center, and sending the data from the process data center to the mobile intelligent terminals;

the decision-making optimization machine calculates out multiple decision-making result solution sets according to the ore dressing production indexes, the target value range of the ore dressing production indexes, the optimized decision-making model as well as boundary and constraint conditions thereof for the ore dressing production indexes, optimized decision-making variables for the ore dressing production indexes, the time range of the production indexes and the time range of the decision-making variables, which are set by the intelligent mobile terminals and through the adoption of the optimized decision-making algorithm and algorithm parameters for the multiple ore dressing production indexes, and sending the multiple decision-making result solution sets to the process data center;

the production scheduling machine is used for calculating out the process control set values according to the final decision-making results, and setting the set values of the controllers PLC or DCS in the ore dressing plant; and the process data center is used for storing production data from the collecting computer and data from the mobile intelligent terminals, converting the form of the data, providing the converted data to the information management machine, the decision-making optimization machine and the production scheduling machine, and receiving and storing information from the information management machine, the decision-making optimization machine and the production scheduling machine.

6. An optimized decision-making method for multiple ore dressing production indexes adopting the optimized decision-making system of claim 1, comprising the following steps:

Step 1: a user sets and then sends the ore dressing production indexes, the target value range of the ore dressing production indexes, the optimized decision-making model as well as boundary and constraint conditions thereof for the ore dressing production indexes, the optimized decision-making variables for the ore dressing production indexes, the time range of the ore dressing production indexes, the time range of the decision-making variables for the ore dressing production indexes, and the optimized decision-making algorithm and algorithm parameters for the multiple ore dressing production indexes at the intelligent mobile terminals to the mobile industrial private cloud server through the cloud server;

Step 2: the mobile industrial private cloud server calculates out multiple decision-making result solution sets according to the ore dressing production indexes, the target value range of the ore dressing production indexes, the optimized decision-making model as well as boundary and constraint conditions thereof for the ore dressing production indexes, the optimized decision-making variables for the ore dressing production indexes, the time range of the ore dressing production indexes and the time range of the decision-making variables for the ore dressing production indexes, which are set by the intelligent mobile terminals and through the adoption of the optimized decision-making algorithm and algorithm parameters for the multiple ore dressing production indexes, sends the multiple decision-making result solution sets to the process data center, and then sends the multiple decision-making result solution sets from the process data center to the intelligent mobile terminals through the cloud server;

Step 3: the intelligent mobile terminals display the decision-making result solution sets, determine the final decision-making results based on the result solution sets, and send the final decision-making results to the mobile industrial private cloud server through the cloud server;

Step 4: the mobile industrial private cloud server calculates out the process control set values according to the final decision-making results, and sends the calculated process control set values to the intelligent mobile terminals through the cloud server;

Step 5: the intelligent mobile terminals display the process control set values, determine the final process control set values, perform equipment and energy resource scheduling and distribution according to the final decision-making results in combination with the data from the collecting computer, and send the results of equipment and energy resource scheduling and distribution and the final process control set values to the mobile industrial private cloud server through the cloud server;

Step 6: the mobile industrial private cloud server sends the determined final process control set values to the process controllers PLC or the DCS;

Step 7: the process controllers PLC or DCS control the equipment on the production line for production according to the final process control set values;

Step 8: the collecting computer collects production data of the process controllers PLC or DCS in the ore dressing plant, and sends the production data to the mobile industrial private cloud server;

Step 9: the industrial private cloud server stores the production data from the collecting computer and sends the production data to the intelligent mobile terminals through the cloud server;

Step 10: the mobile intelligent terminals display the production process data; and Step 11: the dressing production is determined, that is, when a deviation value between the actual production index value and the final decision-making value is larger than a threshold value preset by the user, the operations are enabled to return to Step 2, and a re-optimized decision for remaining production time within the time range of the ore dressing production indexes is made.

* * * * *